United States Patent
Liao et al.

(10) Patent No.: US 11,053,336 B2
(45) Date of Patent: Jul. 6, 2021

(54) HIGH HEAT RESISTANT AND HIGH SCRATCH RESISTANT WATER-BASED POLYURETHANE AND MANUFACTURING METHOD THEREOF

(71) Applicant: NAN YA PLASTICS CORPORATION, Taipei (TW)

(72) Inventors: Te-Chao Liao, Taipei (TW); Sen-Huang Hsu, Taipei (TW); Mi-Fei Hsieh, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 13 days.

(21) Appl. No.: 16/537,454

(22) Filed: Aug. 9, 2019

(65) Prior Publication Data

US 2020/0102416 A1 Apr. 2, 2020

(30) Foreign Application Priority Data

Sep. 27, 2018 (TW) ................. 107134162

(51) Int. Cl.
*C08F 283/00* (2006.01)
*C08F 220/14* (2006.01)
*C08L 51/08* (2006.01)
*C08G 18/00* (2006.01)

(52) U.S. Cl.
CPC .......... *C08F 283/006* (2013.01); *C08L 51/08* (2013.01); *C08L 2201/08* (2013.01); *C08L 2205/16* (2013.01)

(58) Field of Classification Search
CPC ......... C08F 283/006; C08F 283/008; C08F 220/14; C08L 51/08; C08G 18/664; C08G 18/672; C08J 2451/08; C08J 2351/08
See application file for complete search history.

(56) References Cited

U.S. PATENT DOCUMENTS 5,977,215 A * 11/1999 Tien ................... C08G 18/0823
523/402
2011/0250457 A1* 10/2011 Oota ................... C09D 163/00
428/413

FOREIGN PATENT DOCUMENTS

| CN | 101481451 A | * | 7/2009 |
| CN | 105849142 A | | 8/2016 |
| CN | 106049053 A | | 10/2016 |

OTHER PUBLICATIONS

Stefan et al; Reactive and Functional Polymers; 85(2014); pp. 214-220. (Year: 2014).*
Kalia et al; International Journal of Polymer Science, vol. 2011; pp. 1-35. (Year: 2011).*
Machine translation into English of CN 101481451 A; Chen et al; Jul. 2009 (Year: 2009).*

* cited by examiner

*Primary Examiner* — Karuna P Reddy
(74) *Attorney, Agent, or Firm* — Li & Cai Intellectual Property (USA) Office

(57) ABSTRACT

A method for manufacturing high heat resistant and high scratch resistant water-based polyurethane, which can improve the mechanical strength and water resistance of water-based polyurethane by using acrylate graft modification, is provided. In particular, 2-hydroxyethyl acrylate (2-HEA), methyl methacrylate (MMA), ethyl acrylate (EA), acrylic acid (AA), glycidyl methacrylate (GMA) and triallyl isocyanuric acid ester (TAIC) are used to dilute polyurethane prepolymer. As a result, the prepolymer has a good dispersing effect, and further, waterborne bridging agent and cellulose nanofiber are added to the water-based polyurethane to obtain water-based polyurethane which has high heat resistance and scratch resistance.

6 Claims, No Drawings

HIGH HEAT RESISTANT AND HIGH SCRATCH RESISTANT WATER-BASED POLYURETHANE AND MANUFACTURING METHOD THEREOF

CROSS-REFERENCE TO RELATED PATENT APPLICATION

This application claims the benefit of priority to Taiwan Patent Application No. 107134162, filed on Sep. 27, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to acrylic graft modification water-based polyurethane, and more particularly to water-based polyurethane having enhanced heat resistance and scratch resistance.

BACKGROUND OF THE DISCLOSURE

Polyurethane (Polyurethane, abbreviated as PU) is polymer containing urethane units in a main chain, and is a polymer material having good workability, and is widely used in various fields. For example, polyurethane is applied to fiber processing to improve hand feeling, textile processing to improve softness, shrink resistance and antistatic properties, and as a polymer material, a ceramic material and a metal material surface or a bonding agent on the interface between two heterogeneous materials.

In the process of producing polyurethane, a large amount of organic solvent is required, resulting in a problem that polyurethane product contains Volatile Organic Compounds (VOCs). In recent years, with the rise of environmental awareness, water-based polyurethane (DPU) has gradually replaced solvent-based polyurethanes, and is widely used in a variety of applications such as coating processing, leather processing, adhesives, sealants and plastic molding.

However, water-based polyurethane still has disadvantages, such as poor thickening, poor water resistance and gloss of the film-made product, and the film surface is easy to stick. Even by using composite materials or molecular designs to improve their properties, water-based polyurethane still faces challenges in terms of dispersion.

Polyurethanes are oily and are not easily and uniformly dispersed in water. For the method of waterborne polyurethane, there are usually external emulsification method and internal emulsification method. The external emulsification method is to additionally add an emulsifier or a surfactant to reduce the surface tension of the polyurethane and water to promote the uniform dispersion of the polyurethane in water. The internal emulsification method is to select a hydrophilic reactive monomer or introduce an ionic group into the main structure to disperse it in water during the synthesis of the polyurethane. Therefore, the water-based polyurethane is classified according to the introduced group into three types: cationic type, anionic type and nonionic type.

Water-based polyurethane (PU) synthesis method currently uses an acetone process with acetone as a solvent. The method includes the steps of: reacting polyether or polyester polyol with isocyanate to synthesize a high-viscosity prepolymer having an NCO functional group at the end, after the reaction reaches a theoretical value of NCO, a hydrophilic chain extender and a low-boiling solvent compatible with water (such as acetone, methyl ethyl ketone or tetrahydrofuran) are added. Then the prepolymer is dispersed in water to obtain water-based polyurethane which is continuously dispersed through water and is uniformly dispersed. Finally, the solvent (such as acetone) is separated and recycled by distillation. The method has high synthesis reproducibility, but requires investment in solvent distillation purification and recovery equipment, has large solvent consumption, which harms human health and results in environmental pollution, and there are still many residues after solvent distillation, which cannot meet the requirements of true waterborne dispersion.

The hydrophilic chain extender of the water-based polyurethane may be selected from carboxylate such as 2,2-dimethylolpropionic acid (DMPA) and 2,2-dimethylolbutanoic acid (DMBA), and is also required to be used with neutralizer triethylamine (TEA); however, TEA is toxic compound with an irritating odor and does not meet requirements of low odor of water-based polyurethane products.

The water-based polyurethane hydrophilic chain extender may also be selected from sulfonate such as sodium ethylenediamine sulfonate (AAS) and sodium 3,5-diaminobenzenesulfonate (DABS), which is more hydrophilic than carboxylate and has a higher ionization strength. Therefore, the amount of the hydrophilic chain extender can be reduced. In particular, the sulfonate is electrically neutral, and highly stable water-based polyurethane can be prepared without adding amine for neutralization.

SUMMARY OF THE DISCLOSURE

The above-referenced technical inadequacies of the conventional acetone method includes the use of a large amount of solvent, when the viscosity of the prepolymer is high, the dispersion effect is poor, and the subsequent distillation to recover the acetone is improper, which may cause environmental pollution and the like. Therefore, the present disclosure provides water-based polyurethane which adopts acrylate (or acrylic) graft modification so as to improve the disadvantages of low mechanical strength, poor heat resistance and poor water resistance of the polyurethane.

In one aspect, the present disclosure provides water-based polyurethane synthesis method. The water-based polyurethane synthesis method of the invention is to use an acryl monomer instead of an acetone to dilute polyurethane prepolymer. In addition to reducing the amount of the solvent, the prepolymer has excellent dispersion effect, which not only is favorable for subsequent water dispersion and no aggregation, and has no problem of acetone residue; in particular, by diluting the polyurethane prepolymer with more than one acrylic monomer, the prepolymer can have excellent physical properties and promote dissolution and dispersion.

The water-based polyurethane synthesis method of the present disclosure is to combine six acrylic monomer-diluted polyurethane prepolymers, including 2-hydroxyethyl acrylate (2-HEA), methacrylic acid methyl methacrylate (MMA), ethyl acrylate (EA), acrylic acid (AA), glycidyl methacrylate (GMA) and triallyl isocyanurate (1,3,5-tri (prop-2-en-1-yl)-1,3,5-triazinane-2,4,6-trione, TAIC).

The water-based polyurethane of the present disclosure is water-based polyurethane modified by acrylic graft modification. A main chain of polyurethane resin has an anionic group and a nonionic group formed by a polyisocyanate and a polyol. A side chain has an anionic group, a nonionic group containing a sulfonic acid group and an acryl group dispersed therein.

The water-based polyurethane synthesis method of the present disclosure includes the following steps:

1. Preparation of Prepolymer:

15-25 wt % of polyol (containing CD220 polycarbonate diol, molecular weight 2000, NY-2058 polyester diol, molecular weight 2000 and 1,6-hexanediol) is vacuum dehydrated and added to a reactor equipped with a stirrer, a thermometer and a condenser tube. When the temperature of the oil bath reaches 70° C. to 80° C., 5-12 wt % of the metered diisocyanate is added to cause a synthesis reaction;

2. Dilution and Chain Extension of the Prepolymer:

After the reaction of the prepolymer for 2-3 hours, add 10-30 wt % acrylic monomer to dilute and reduce viscosity, maintain the temperature at 85° C. to 90° C. until the NCO content reaches the theoretical value (determined by di-n-butylamine method), then add sodium ethionate (AAS) 1.5-3.0 wt %, and continue the reaction for 25-40 minutes;

3. Water Dispersion:

The polymer obtained in step 2 is cooled to room temperature, an appropriate amount of deionized water 35-55 wt % is added under a high-speed shearing force of 500 rpm, and then 0.1 to 0.5 wt % of the metered chain extender is added to carry out chain extension reaction for about 30 minutes, thereby obtaining solvent-free sulfonate-type water-based polyurethane;

4. Acrylic Synthesis:

In continuance of step 3, an emulsifier 0.3-1.0 wt % is added to form an emulsion, heated to 50-70° C., then 0.05-0.5 wt % of the initiator is added to polymerize the acrylic. The temperature is further raised to 75-85° C., and after maintaining a constant temperature for 1-3 hours, the temperature is lowered to 50-70° C., and the reducing agent of 0.01-0.08 wt % is added to obtain an acrylic graft modification water-based polyurethane;

5. Resin Blending:

In order to enhance physical properties of the acrylic graft modification water-based polyurethane, waterborne polycarbodiimide bridging agent in an amount of 3-9 wt % and cellulose nanofiber is 0.1-2 wt % are added so as to obtain water-based polyurethane with high heat resistance and high scratch resistance.

A theoretical value of NCO % refers to the weight of remaining isocyanategroup in the reaction of the polyurethane (PU) as a percentage of the weight of all the reactants involved, after the isocyanate (—NCO) of the polyisocyanate is completely reacted with hydroxylgroup (—OH) contained in the polyhydric alcohol. The theoretical value of NCO %=(amount of polyisocyanate/molecular weight of polyisocyanate−amount of polypolyol/molecular weight of polypolyl)*42*2*%, and the theoretical value of NCO % is 0.5-10%. In the present embodiment, a NCO % reaction titration value is NCO % measured by dibutylamine titration before the reaction, that is, before adding water and emulsification in the steps of a dibutylamine titration method.

The NCO % reaction titration value of the polyurethane resin is between 50% and 85% of the theoretical value of NCO %, so that the polyurethane resin is in a state of stable dispersion in the water-based polyurethane to prevent the polyurethane resin from agglomerating into gel.

When the polyurethane is synthesized, if the polyisocyanate is excessively reacted and the NCO % reaction titration value is lower than 50% of the theoretical value of NCO %, the degree of crosslinking of the polyurethane network structure is too high due to excessive reaction of the polyurethane, which leads to the failure of the polyurethane by producing a large amount of agglomerated gel in the aqueous phase; if the NCO % reaction titration value is higher than 85% of the theoretical value of NCO %, the water-based polyurethane may be insufficient due to insufficient proportion of the mesh structure of the synthesized polyurethane. After the water-based polyurethane is processed to form a film, the surface of the film is excessively viscous, which tends to cause sticking between the films and result in scrapping thereof.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Water-based polyurethane synthesis method of the present disclosure is carried out by a four-stage polymerization of a polyurethane resin modified by an acrylic graft modification. This synthetic method not only facilitates the synthesis of solvent-free water-based polyurethane, but also achieves the effect of acrylic graft modification. The water-based polyurethane synthesis method of the present disclosure includes the following steps:

1. Preparation of Prepolymer:

The prepolymer is synthesized by an urethanization reaction between polyhydric alcohol and diisocyanate; preferably, the NCO theoretical equivalent ratio (NCO/OH) of the prepolymer is from 1.1 to 2.7. The polypolyol is selected from polyester polyol, polyether polyol, polycarbonate polyol and polyester decylamine polyol; the diisocyanate is selected from aliphatic diisocyanate, alicyclic diisocyanate and modified form thereof, and may be used singly or in combination of two or more.

The polyester polyol is prepared by condensation of low molecular weight diol and dicarboxylic acid. The diol is selected from ethyleneglycol, 1,3-propanediol and 1,4-butanediol; the dicarboxylic acid is selected from succinic acid, glutaric acid, adipic acid, pimelic acid, suberic acid, azelaic acid, sebacic acid, decanedicarboxylic acid and cyclohexanedicarboxylic acid.

The polyester decylamine polyol is an amine polyester decylamine polyol selected from hexamethylenediamine or isophorone diamine.

Each of the above polyols may be used singly or in combination of several or as copolymer thereof.

The polyether polyol is selected from polytetramethylene etherglycol (PTMG), polypropyleneglycol (PPG) and polyether polyol whose main chain and side chain are polyethyleneglycol (PEG).

The aliphatic diisocyanate is selected from tetramethylene diisocyanate, hexamethylene diisocyanate, decamethylene diisocyanate and lysine diisocyanate; preferably hexamethylene diisocyanate.

The alicyclic diisocyanate is selected from isophorone diisocyanate, hydrogenated toluene diisocyanate, hydrogenated xylene diisocyanate, hydrogenated diphenylmethane diisocyanate and tetramethylxylene diisocyanate; preferably isophorone diisocyanate.

The urethane modified body of the aliphatic diisocyanate or the alicyclic diisocyanate is selected from a carbodiimide modified body, an allophanate modified body, a urea modified body, a biuret modified body, an uretodion modified body, an uretonimine modified form, and an isocyanurate modified form.

The diisocyanate may also be substituted with aromatic polyisocyanate or aromatic diisocyanate. The aromatic polyisocyanate is selected from polyphenylene polymethylene polyisocyanate and unrefined tolylene diisocyanate.

The aromatic diisocyanate is selected from 2,4-toluene diisocyanate, 2,6-toluene diisocyanate, xylene-1,4-diisocyanate, xylene-1,3-diisocyanate, 4,4'-diphenylmethane diisocyanate, 2,4'-diphenylmethane diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, isophthalic diisocyanate, P-phenylene diisocyanate, naphthalene-1,4-diisocyanate, naphthalene-1,5-diisocyanate and 3,3'-dimethoxydiphenyl-4,4'-diisocyanate.

The present disclosure uses low molecular polyol and the diisocyanate for urethane reaction. The low molecular polyol is selected from ethyleneglycol, 1,3-propanediol, 1,2-propanediol, 1,2-butanediol, 1,3-butanediol, 1,4-butanediol, 1,5-pentanediol, 1,6-hexanediol, 3-methyl-1,5-pentanediol, neopentylglycol, 1,8-octanediol, 1,9-nonanediol, 3,3-dimethylol heptane, diethyleneglycol, 1,4-cyclohexanediol, 1,4-cyclohexanedimethanol, 2-ethyl-1,3-propanediol, 2-n-propyl-1,3-propanediol, 2-isopropyl-1,3-propanediol, 2-n-butyl-1,3-propanediol, 2-isobutyl-1,3-propanediol, 2-tert-butyl-1,3-propanediol, 2-methyl-2-ethyl-1,3-propanediol, 2,2-diethyl-1,3-propanediol, 2-ethyl-2-n-propyl-1,3-propanediol, 2-ethyl-2-n-butyl-1,3-propanediol, 2-ethyl-3-ethyl-1,4-butanediol, 2-methyl-3-ethyl-1,4-butanediol, 2,3-diethyl-1,5-pentanediol, 2,4-diethyl-1,5-pentanediol and 2,3,4-triethyl-1,5-pentanediol; or selected from trimethylolpropane, dimethylolpropionic acid, dimethylolbutanoic acid, dibasic acid diol, glycerin, pentaerythritol and bisphenol A.

2. Dilution and Chain Extension of the Prepolymer:

The acrylic monomer may be an acrylate monomer selected from one or any combination of methyl acrylate, methyl methacrylate (MMA), ethyl acrylate (EA), isooctyl acrylate, butyl acrylate, butyl methacrylate, ethyl hexyl acrylate, and 2-hydroxyethyl acrylate (2-HEA); further, monomethyl maleate, monomethyl itaconate, monomethyl fumarate, styrene, acrylic acid (AA), glycidyl methacrylate (GMA), triallyl isocyanurate (TAIC) and mixtures thereof replace acrylate monomers can also be adopted.

Preferably, six acrylic monomers 2-hydroxyethyl acrylate (2-HEA), methyl methacrylate (MMA), ethyl acrylate (EA), acrylic acid (AA), glycidyl methacrylate (GMA), and triallyl isocyanurate (TAIC) are in combination, so as to achieve the effect of complementary of physical properties and has solvent effect. In particular, the combination of these six acrylic monomers has a solvent effect, and does not require the use of a large amount of acetone, the synthesis reaction yield can be greatly increased, and the production cost is effectively reduced.

The water-based polyurethane synthesis method of the present disclosure is that, after the prepolymer is reacted for 2-3 hours, the above-mentioned six kinds of monomers are added, the solvent dispersion effect can be exerted, and the graft polymerization is carried out in the acrylic synthesis stage. The effects of the six monomers are as follows:

(1) 2-hydroxyethyl acrylate (2-HEA) contains a hydroxyl group (—OH) and can react with isocyanate;

(2) Methyl methacrylate (MMA) and ethyl acrylate (EA) can increase the acrylic molecular weight so as to compensate for the disadvantages of poor heat resistance and low mechanical strength of polyurethane;

(3) Acrylic acid (AA), also known as acrylic acid, is an organic compound of the chemical formula $C_3H_4O_2$. It is the simplest unsaturated carboxylic acid, and consists of a vinyl group and a carboxyl group, which can react with carboxylic acids, and a corresponding ester can also be obtained by reacting with an alcohol; when acrylic acid and its esters are mixed with other monomers, polymerization will occur to form a homopolymer or copolymer;

(4) Glycidyl methacrylate (GMA) has a vinyl group and an epoxy ring, which can react differently, and then use a radical to open a double bond to form an epoxy ring linear polymer with other acrylic monomers; the epoxy ring is cross-linked with the carboxylic acid in the system under the catalysis of an acid or an amine; and (5) Triallyl isocyanurate (TAIC) is a multifunctional olefin monomer containing aromatic heterocyclic ring, which can be homopolymerized and cross-linked with various olefins, so as to improve the heat resistance and mechanical strength of the polyurethane, and achieve excellent physical properties and solvent effect; in addition, because a large amount of acetone is not used, the synthesis reaction yield can be greatly increased, and the production cost is effectively reduced.

Based on the total amount in weight of the acrylic monomer, the combination ratio of six kinds of acrylic monomers of 2-HEA, MMA, EA, AA, gMA and TAIC is as follows:

1) methyl methacrylate (MMA) 80-90 wt %;
2) 2-hydroxyethyl acrylate (2-HEA) 3-9 wt %;
3) ethyl acrylate (EA) 2-10 wt %;
4) acrylic acid (AA) 0.5-5 wt %;
5) glycidyl methacrylate (GMA) 0.1-2 wt %;
6) triallyl isocyanurate (TAIC) 0.1-2 wt %

A combination of methyl methacrylate 82 wt %, 2-hydroxyethyl acrylate 6 wt %, ethyl acrylate 6 wt %, acrylic acid 3 wt %, glycidyl methacrylate 1.5 wt % and triallyl isocyanurate 1.5 wt % is particularly preferred.

In order to extend the prepolymer chain, the present disclosure uses a sulfonate chain extender, which is not only used as hydrophilic agent for polyurethanes, but also as polymeric emulsifier in an amount of 80-90% of the theoretical equivalent ratio of NCO (NCO/OH). The sulfonate chain extender is selected from sodium ethylenediamine sulfonate (AAS), sodium 2,4-diaminobenzenesulfonate, sodium 3,5-diaminobenzenesulfonate (DABS), 1,4-butanediol-2-sulfonate sodium, sodium 1,2-dihydroxy-3-propane sulfonate and sodium N,N-dihydroxyethylamine ethylsulfonate; preferably AAS or DABS.

3. Water Dispersion:

After the obtained polymer is dispersed in water, a metered water-soluble diamines chain extender is added to carry out a chain extension reaction; The chain extender is selected from a low molecular polyamine having a (number average) molecular weight of less than 500, including ethylenediamine, hexamethylenediamine, xylenediamine, isophoronediamine, diethylenetriamine or N-Aminoethyl-N-ethanolamine; and the chain extender is used in an amount of (NCO/OH) equivalent of 10% to 20%.

4. Acrylic Synthesis:

A sulfonate-type water-based polyurethane of the abovementioned step is added with an emulsifier of 0.3 to 1.0 wt % to form an emulsion, and the temperature is raised to 50-70° C., and then 0.01 to 0.10 wt % of a initiator is added dropwise to carry out polymerization of the acrylate. The temperature is further increased to 75-85° C., and maintained for 1-3 hours, then lowered to 50-70° C., and then the reducing agent is added 0.01-0.08 wt % to obtain an acrylic graft modification water-based polyurethane.

Emulsifier is a kind of surfactant, which can greatly reduce the surface tension, and transform the mutually incompatible two-phase oil-water into a white emulsion. The white emulsion is an essential component of emulsion polymerization which can be stably existed and is not easy to be layered by stirring. The emulsifier may be a mixture of one or more of an anionic, a nonionic or a reactive emulsifier.

The anionic emulsifier is selected from sodium dodecyl sulfate (SLS), sodium dodecyl benzene sulfonate, potassium stearate, sodium dioctyl sulfosuccinate, sodium dodecyl dibenzoate disulfonate, nonylbenzene oxyethyl poly(1) ammonium ethoxide sulfate, sodium styrene sulfonate, sodium lauryl allylsulphosuccinate, linseed oil fatty acid, sodium or ammonium salt of ethoxylated nonylphenol phosphate, octoxynol 3-sulfonate sodium, sodium cocoyl sarcosinate, sodium 1-alkoxy-2-hydroxypropyl sulfonate, sodium α-olefin (C14-C16) sulfonate, hydroxyl Sulfate of alkanol, tetrasodium N-(1,2-dicarboxyethyl)-N-octadecylsulfosuccinic acid, disodium N-octadecylsulfosuccinamide, alkane disodium sulphate polyethoxy sulfosuccinate, disodium ethoxylated succinyl sulfosuccinate and sodium ethoxyethyl sulfate. The amount of the emulsifier is 3 wt % or less based on the total amount of the acrylate monomer, and is 0.3-1.0 wt % based on the total amount in weight of the reactive material.

The nonionic or reactive emulsifier includes teoctylphenoxyethyl poly(39)-ethoxyethanol, dodecyloxypoly (10) ethoxyethanol, nonylphenoxyethyl-poly (40) ethoxyethanol, polyethyleneglycol 2000 monooleate, hydroxyethylated castor oil, fluorinated alkyl esters and alkoxides, polyoxyethylene (20) sucrose monolaurate, sucrose cocoate, bis(2-butyl)phenoxypoly (20) ethoxyethanol and hydroxyethylcellulose butyl acrylategraft copolymer.

The initiator is preferably a water-soluble free radical initiator selected from hydrogen peroxide, tert-butyl peroxide and alkali metal persulfate; or selected from sodium persulfate, potassium persulfate, lithium persulfate and ammonium sulfate (APS); the amount of the initiator is 0.01-3 wt % based on the total amount in weight of the acrylate monomer, and is 0.01-0.10 wt % based on the total amount in weight of the reactive material.

In the late stage of emulsion polymerization, in order to avoid emulsion agglomeration caused by heating, post-removal of the monomer can be carried out at 50-70° C. with reducing agent to reduce the monomer residual ratio. The reducing agent is selected from sulfites such as alkali metal metasulfite, sulfite and hyposulfite, sodium formaldehyde sulfoxylate (SFS), t-butyl hydroperoxide (TBHP), and reducing sugars such as ascorbic acid and isoascorbic acid; wherein, sodium formaldehyde sulfoxylate (SFS) is eliminated after used on monomers such as methyl methacrylate and 2-hydroxyethyl acrylate; tert-butyl hydroperoxide (TBHP) is eliminated after used on monomers such as ethyl acrylate and butyl acrylate. The amount of the reducing agent is 0.1-0.3 wt % based on the total amount in weight of the acrylate monomer, and is 0.01-0.08 wt % based on the total amount in weight of the reactive material.

5. Resin Blending:

To further enhance the physical properties of the acrylic graft modification water-based polyurethane, based on the total amount in weight of the water-based polyurethane, add waterborne bridging agent 3-9 wt % and cellulose nanofiber (CNF) 0.1-2 wt %, preferably add waterborne bridging agent 6 wt % and cellulose nanofiber 0.1 wt %, and most preferably add polycarbodiimide waterborne bridging agent 6 wt % and the cellulose nanofiber (CNF-1) 0.1 wt %, so as to prepare water-based polyurethane having high heat resistance and high scratch resistance.

The waterborne bridging agent is selected from waterborne bridging agent of polycarbodiimide, aziridine type, oxazoline group, NCO type, melamine type and epoxy group, and can be used alone or in combination of two or more. Preferably, the polycarbodiimide waterborne bridging agent is selected.

The cellulose nanofibers are selected from cellulose nanofiber having a fiber diameter of 3-10 nm and a fiber length of 100 nm-3 μm, and may be used alone or in combination of two or more. Preferably, the cellulose nanofiber CNF-1 having a diameter of 5-10 nm and a fiber length of 1-3 μm is used.

More specifically, the water-based polyurethane synthesis method of the present disclosure uses an acrylic graft modification without using an acetone solvent, and the specific synthesis steps are as follows:

1. Preparation of Prepolymer:

Based on the total amount in weight of reactive materials (including deionized water), 15-25 wt % of poly-polyol after vacuum dehydration is added to a reactor equipped with a stirrer, a thermometer and a condenser tube until the temperature of the oil bath reaches 70-80° C., and then 5-12 wt % of metered diisocyanate is added to cause a synthesis reaction. The polypolyol is selected from CD220 polycarbonate diol (molecular weight 2000), NY-2058 polyester diol (molecular weight 2000) and 1,6-hexanediol.

2. Dilution and Chain Extension of the Prepolymer:

After the prepolymer is reacted for 2-3 hours, add 10-30 wt % acrylic monomer to dilute viscosity and maintain the temperature at 85-90° C. until the NCO content reaches the theoretical value (measured by di-n-butylamine method), then 1.5 to 3.0 wt % of the sulfonate chain extender is added, preferably sodium edetate ethyl sulfonate (AAS) is added, and the reaction is continued for 25-40 minutes;

3. Water Dispersion:

The polymer obtained in step 2. is cooled to room temperature, and an appropriate amount of deionized water is added at 35-55 wt % under a high-speed shearing force of 500 rpm, and 0.1-0.5 wt % of a metered chain extender is added to carry out chain extension reaction for about 30 minutes, so as to prepare a solvent-free sulfonate-type water-based polyurethane.

4. Acrylic Synthesis:

The sulfonate-type water-based polyurethane of the preceding step (3) is added with an emulsifier of 0.3-1.0 wt % to form an emulsion, and the temperature is raised to 50-70° C., and then 0.05-0.5 wt % of a initiator is added dropwise to carry out polymerization of the acrylate. Further, the temperature is raised to 75-85° C., and the temperature is maintained for 1-3 hours. Later the temperature is lowered to 50-70° C., and then the reducing agent is added 0.01-0.08 wt % to obtain acrylic graft modification water-based polyurethane.

5. Resin Blending:

Based on the total amount in weight of the acrylic graft modification water-based polyurethane of the previous step 4., add polycarbodiimide waterborne bridging agent 3-9 wt % and cellulose nanofiber 0.1-2 wt % to the acrylic graft modification water-based polyurethane of the previous step 4. so as to obtain water-based polyurethane with high heat resistance and high scratch resistance.

The solvent-free water-based polyurethane manufacturing method of the present disclosure using acrylic graft modification will be further described below with reference to the embodiment and the comparative examples, but the present disclosure is not limited thereto.

Embodiment 1

Preparation of Water-Based Polyurethane (A Resin):

78.8 g CD220 (polycarbonate diol, molecular weight 2000), 20 g NY-2058 (polyester diol, molecular weight 2000), 6.44 g 1,6-HG (1,6-hexanediol, molecular weight 118) are sequentially added to the reactor, and temperature is raised to 80° C. under constant stirring. Then, 43.5 g of isophorone diisocyanate is added, and temperature is raised to 85-90° C., and reacted at this temperature for 2-3 hours. At this time, 131.2 g of methyl methacrylate (MMA), 9.6 g 2-hydroxyethyl acrylate (2-HEA), 9.6 g ethyl acrylate (EA), 4.8 g acrylic acid (AA), 2.4 g glycidyl methacrylate (GMA)), and 2.4 g triallyl isocyanurate (TAIC) are added sequentially so as to diluted and reduce viscosity. 10.7 g sodium ethylenediamine ethanesulfonate (AAS) is added to the prepolymer, and after the reaction continues for 25-40 minutes, the temperature is lowered to room temperature, then 236.3 g of deionized water is added at 500 rpm, and then 0.95 g of ethylenediamine is added. The chain extension reaction is carried out for about 30 minutes to prepare solvent-free sulfonate-type water-based polyurethane emulsion.

Preparation of Polyacrylic Emulsion (B Resin):

Under rapid stirring, 4.8 g of sodium lauryl sulfate (SLS) is added to the obtained sulfonate-type water-based polyurethane emulsion, and the temperature is raised to 50-70° C., followed by dropwise addition of aqueous ammonium persulfate solution (APS) 0.40 g. Continue to raise the temperature to 75-85° C., and maintain at this temperature for 1-3 hours. After cooling to 50-70° C., 0.15 g of reducing agent t-butyl hydroperoxide solution (TBHP) and 0.16 g sodium formaldehyde sulfoxylate (SFS) are added and reacted for 30 minutes to obtain acrylic graft modification water-based polyurethane.

According to the weight ratio (wt %) of the (A resin):(B resin)=1:1, the film is formed by acrylic graft modification water-based polyurethane obtained by mixing A resin and B resin. The physical properties of the film are tested and the results are shown in Table 1.

Embodiment 2

Preparation of Water-Based Polyurethane (A Resin):

157.6 g CD220 (polycarbonate diol, molecular weight 2000), 40 g NY-2058 (polyester diol, molecular weight 2000), 12.88 g 1,6-HG (1,6-hexanediol, molecular weight 118) are sequentially added to the reactor, and temperature is raised to 80° C. under constant stirring. Then, 87 g of isophorone diisocyanate is added, and temperature is raised to 85-90° C., and reacted at this temperature for 2-3 hours. At this time, 131.2 g methyl methacrylate (MMA), 9.6 g 2-hydroxyethyl acrylate (2-HEA), 9.6 g ethyl acrylate (EA), 4.8 g acrylic acid (AA), 2.4 g of glycidyl methacrylate (GMA)), and 2.4 g triallyl isocyanurate (TAIC) are added sequentially so as to diluted and reduce viscosity. 21.4 g sodium ethylenediamine ethanesulfonate (AAS) is added to the prepolymer, and after the reaction continues for 25-40 minutes, the temperature is lowered to room temperature, then 472.6 g of deionized water is added at 500 rpm, and then 1.9 g of ethylenediamine is added. The chain extension reaction is carried out for about 30 minutes to prepare solvent-free sulfonate-type water-based polyurethane emulsion.

Preparation of Polyacrylic Emulsion (B Resin):

Under rapid stirring, 4.8 g of sodium lauryl sulfate (SLS) is added to the obtained sulfonate-type water-based polyurethane emulsion, and the temperature is raised to 50-70° C., followed by dropwise addition of aqueous ammonium persulfate solution (APS) 0.40 g. Continue to raise the temperature to 75-85° C., and maintain at this temperature for 1-3 hours. After cooling to 50-70° C., 0.15 g of reducing agent t-butyl hydroperoxide solution (TBHP) and 0.16 g sodium formaldehyde sulfoxylate (SFS) are added and reacted for 30 minutes to obtain acrylic graft modification water-based polyurethane.

The amount of the A resin is increased, and by the weight ratio (wt %) of the (A resin):(B resin)=2:1, the film is formed by acrylic graft modification water-based polyurethane obtained by mixing A resin and B resin. The physical properties of the film are tested and the results are shown in Table 1.

Embodiment 3

Preparation of Water-Based Polyurethane (A Resin):

236.4 g CD220 (polycarbonate diol, molecular weight 2000), 60 g NY-2058 (polyester diol, molecular weight 2000), 19.32 g 1,6-HG (1,6-hexanediol, molecular weight 118) are sequentially added to the reactor, and temperature is raised to 80° C. under constant stirring. Then, 130.5 g of isophorone diisocyanate is added, and temperature is raised to 85-90° C., and reacted at this temperature for 2-3 hours. At this time, 131.2 g methyl methacrylate (MMA), 9.6 g 2-hydroxyethyl acrylate (2-HEA), 9.6 g ethyl acrylate (EA), 4.8 g acrylic acid (AA), 2.4 g of glycidyl methacrylate (GMA)), and 2.4 g triallyl isocyanurate (TAIC) are added sequentially so as to diluted and reduce viscosity. 32.1 g sodium ethylenediamine ethanesulfonate (AAS) is added to the prepolymer, and after the reaction continues for 25-40 minutes, the temperature is lowered to room temperature, then 708.9 g of deionized water is added at 500 rpm, and then 2.9 g of ethylenediamine is added. The chain extension reaction is carried out for about 30 minutes to prepare a solvent-free sulfonate-type water-based polyurethane emulsion.

Preparation of Polyacrylic Emulsion (B Resin):

Under rapid stirring, 4.8 g of sodium lauryl sulfate (SLS) is added to the obtained sulfonate-type water-based polyurethane emulsion, and the temperature is raised to 50-70° C., followed by dropwise addition of aqueous ammonium persulfate solution (APS) 0.40 g. Continue to raise the temperature to 75-85° C., and maintain at this temperature for 1-3 hours. After cooling to 50-70° C., 0.15 g of reducing agent t-butyl hydroperoxide solution (TBHP) and 0.16 g sodium formaldehyde sulfoxylate (SFS) are added and reacted for 30 minutes to obtain acrylic graft modification water-based polyurethane.

The amount of the A resin is increased, and by the weight ratio (wt %) of the (A resin):(B resin)=3:1, the film is formed by acrylic graft modification water-based polyurethane obtained by mixing A resin and B resin. The physical properties of the film are tested and the results are shown in Table 1.

Comparative Example 1

Preparation of Water-Based Polyurethane by Acetone: (A Resin):

59.82 g CD220 (polycarbonate diol, molecular weight 2000), 15.18 g NY-2058 (polyester diol, molecular weight 2000), 7.3 g 1,6-HG (1,6-hexanediol, molecular weight 118) are sequentially added to the reactor, and temperature is raised to 80° C. under constant stirring. Then, 58.8 g of isophorone diisocyanate is added, and temperature is raised to 85-90° C., and reacted at this temperature for 2-3 hours. After cooling temperature to 30-50° C., 160 g of acetone is added to reduce viscosity. After 20 minutes, add 17.5 g of sodium ethylenediamine sulfonate (AAS). The temperature is cooled to room temperature after the reaction is continued for 25-40 minutes, then 266.6 g of deionized water is added at 500 rpm, and 1.1 g of ethylenediamine is added for chain extension reaction for about 30 minutes. Later, acetone is distilled to obtain acyl-free water-based polyurethane emulsion which is free of acrylic.

A film is formed by processing an acrylic-free sulfonate-based water-based polyurethane emulsion (A resin). The physical properties of the film were tested and the results are shown in Table 1.

TABLE 1

Formulation composition and physical properties of the prepared film

| | | Embodiment 1 | Embodiment 2 | Embodiment 3 | Comparative example 1 |
|---|---|---|---|---|---|
| Test Result | Tensile strength (kg/cm$^2$) | 420 | 358 | 296 | 231 |
| | Elongation at break (%) | 355 | 407 | 470 | 520 |
| | Heat resistance (120° C.*7 days)ΔE | 5.0 | 5.8 | 6.8 | 8.0 |
| | Scratch resistance | Scratches | Scratches | Scratches | Scratches |
| | Heat resistant adhesive (80° C.*3 Kg*24 hr) | Slightly sticky | non-sticky | non-sticky | severely sticky |
| | Hydrolysis resistance (10% NaOH*8 hr) | Slightly cracked | no cracks | no cracks | severely cracked |
| | Acetone content (ppm) | N/D | N/D | N/D | 2530 ppm |

According to the physical property test results of Table 1, the film properties of embodiments 1-3 increased according to the ratio of acryl in water-based polyurethane. The tensile strength increased, the elongation at break decreased, the heat-resistant adhesive and hydrolysis resistance improved, and the heat resistance decline. This description, by means of acrylic graft modification, can compensate for the disadvantages of water-based polyurethane, such as low mechanical strength, poor heat resistance and hydrolysis resistance.

Embodiments 4-15 and Comparative Example 2

The acrylic graft modification water-based polyurethane prepared from embodiment 1 is taken. According to the type and amount of waterborne bridging agent in Table 2, acrylic graft modification water-based polyurethane is added with waterborne bridging agent. The waterborne bridging agent is selected from carbodiimide, aziridine type, oxazoline group, NCO type, melamine type, or epoxy group, etc., and the addition amount is 3-9 wt %.

The acrylic graft modification water-based polyurethane of the embodiments 4-15 was processed to form a film. The physical properties of the film are tested and the results are shown in Table 2.

Comparative Example 2 is acrylic graft modification water-based polyurethane prepared from embodiment 1. The waterborne bridging agent is not added, and the physical properties of the film were tested after being processed to form a film. The results are shown in Table 2.

TABLE 2

Formulation of film physical property test results prepared by waterborne bridging agent

| Sample number | Types of bridging agent | | | | Heat resistance ΔE | Scratch resistance |
| --- | --- | --- | --- | --- | --- | --- |
| | carbodiimide | Aziridine type | Oxazoline group | NCO type | | |
| embodiment 4 | 3 wt % | — | — | — | 4.5 | Slightly scratched |
| embodiment 5 | 6 wt % | — | — | — | 4.2 | No scratches |
| embodiment 6 | 9 wt % | — | — | — | 4.3 | No scratches |
| embodiment 7 | — | 3 wt % | — | — | 5.5 | Slightly scratched |
| embodiment 8 | — | 6 wt % | — | — | 5.9 | No scratches |
| embodiment 9 | — | 9 wt % | — | — | 6.1 | No scratches |
| embodiment 10 | — | — | 3 wt % | — | 5.0 | Slightly scratched |
| embodiment 11 | — | — | 6 wt % | — | 4.8 | Slightly scratched |
| embodiment 12 | — | — | 9 wt % | — | 4.9 | Slightly scratched |
| embodiment 13 | — | — | — | 3 wt % | 5.2 | Slightly scratched |
| embodiment 14 | — | — | — | 6 wt % | 5.0 | No scratches |
| embodiment 15 | — | — | — | 9 wt % | 5.0 | No scratches |
| Comparative Example 2 | — | — | — | — | 5.0 | Scratches |

The acrylic emulsion contains COOH. The active hydrogen atom (H) or water-based polyurethane (containing active hydrogen atom H) can be added to the waterborne bridging agent reaction to improve adhesion, washing fastness, abrasion resistance, heat-resistant adhesion and other physical properties.

According to the film physical properties test results of Table 2, that is, comparing the physical properties of the films of the embodiments 4-15 and the comparative example 2, that the formation of the film by the acrylic graft modification water-based polyurethane resin added with the waterborne bridging agent can enhance the acrylic graft modification water-based polyurethane heat resistance and scratch resistance is confirmed.

According to the results of the film physical properties test of Table 2, the best scratch resistance was obtained by adding an acrylic graft modification water-based polyurethane resin 6 wt % of carbodiimide type waterborne bridging agent.

Embodiments 16-24 and Comparative Example 3

The acrylic graft modification water-based polyurethane prepared from embodiment 1 is taken. According to the type and amount of cellulose nanofiber and waterborne bridging agent in Table 3, acrylic graft modification water-based polyurethane is added with cellulose nanofiber and waterborne bridging agent. The waterborne bridging agent is carbodiimide type waterborne bridging agent added in an amount of 6 wt %; the cellulose nanofiber (cellulose nanofiber; CNF) is selected from fiber having a diameter of 3-100 nm and a fiber length of 100 nm-5 μm. The cellulose nanofiber is added in an amount of 0.1-2 wt %.

The acrylic graft modification water-based polyurethane of the embodiments 16-24 was processed to form a film. The physical properties of the film are tested and the results are shown in Table 3.

Comparative Example 3 is acrylic graft modification water-based polyurethane prepared from embodiment 1, and adding 6 wt % carbodiimide type waterborne bridging agent, but without adding cellulose nanofiber, after being processed to form a film, the test film is obtained. The physical properties are shown in Table 3.

TABLE 3

Formulation of film physical property test results prepared by adding cellulose nanofiber

| | bridging agent Carbodiimide | Types of cellulose nanofiber specification | | | Heat resistance ΔE | Scratch resistance |
| --- | --- | --- | --- | --- | --- | --- |
| | | CNF-1 | CNF-3 diameter | CNF-4 | | |
| | | 5~10 nm | 5~10 nm | 3~10 nm | | |
| Sample number | (wt %) | 1~3 μm length | 100~500 nm | 100~500 nm | | |
| embodiment 16 | 6 | 0.1 wt % | — | — | 3.5 | No scratches |
| embodiment 17 | 6 | 0.5 wt % | — | — | 3.5 | No scratches |

TABLE 3-continued

Formulation of film physical property test results prepared by adding cellulose nanofiber

| Sample number | bridging agent Carbodiimide (wt %) | CNF-1 5~10 nm 1~3 μm | CNF-3 diameter 5~10 nm length 100~500 nm | CNF-4 3~10 nm 100~500 nm | Heat resistance ΔE | Scratch resistance |
|---|---|---|---|---|---|---|
| embodiment18 | 6 | 1 wt % | — | — | 3.8 | Slightly scratched |
| embodiment19 | 6 | — | 0.1 wt % | — | 4.2 | No scratches |
| embodiment20 | 6 | — | 0.5 wt % | — | 4.0 | No scratches |
| embodiment21 | 6 | — | 1 wt % | — | 4.3 | Slightly scratched |
| embodiment22 | 6 | — | — | 0.1 wt % | 4.3 | No scratches |
| embodiment23 | 6 | — | — | 0.5 wt % | 4.0 | No scratches |
| embodiment24 | 6 | — | — | 1 wt % | 4.0 | Slightly scratched |
| Comparative Example 3 | 6 | — | — | — | 4.2 | No scratches |

According to the results of the physical property test of the film of Table 3, that is, comparing the physical properties of the films of the embodiments 16-24 and the comparative example 3, that the film is formed by the addition of waterborne bridging agent and cellulosegraft modification water-based polyurethane resin is confirmed. In addition to improving scratch resistance, the mechanical strength, water resistance, heat resistance and film formability of the acrylic graft modification water-based polyurethane resin can be further improved.

According to the results of the physical property test of the film of Table 3, the embodiments 16 and 17 can obtain the best heat resistance and scratch resistance by adding 0.5-0.5 wt % nanofiber CNF-1 (diameter 5-10 nm, fiber length 1-3 μm) waterborne bridging agent acrylic graft modification water-based polyurethane resin.

In conclusion, the water-based polyurethane of the present disclosure can enhance mechanical strength, and improve characteristics of water resistance, heat resistance, scratch resistance and film formation, etc., by means of acrylic graft modification and addition of waterborne bridging agent and cellulose Nano fiber. In particular, when a film is produced using the water-based polyurethane of the present disclosure, the film can be provided with good scratch resistance, heat resistance, heat-resistant adhesiveness, hydrolysis resistance, mechanical properties, and the like.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing high heat resistant and high scratch resistant water-based polyurethane, based on the total amount in weight of a reactive material of a polyurethane prepolymer, adding 10 to 30 wt % of acrylic monomer to dilute the polyurethane prepolymer so as to synthesize water-based polyurethane, and then adding initiator to make acrylic graft modification water-based polyurethane, wherein the acrylic monomer is a combination of the following six monomers: 3-9 wt % of 2-hydroxyethyl acrylate (2-HEA), 80-90 wt % of methyl methacrylate (MMA), 2-10 wt % of ethyl acrylate (EA), 0.5-5 wt % of acrylic acid (AA), 0.1-2 wt % of glycidyl methacrylate (GMA) and 0.1-2 wt % of triallyl isocyanurate (TAIC).

2. The method for manufacturing the high heat resistant and high scratch resistant water-based polyurethane according to claim 1, wherein 3-9 wt % of waterborne bridging agent is added to the acrylic graft modification water-based polyurethane based on the total amount in weight of the acrylic graft modification water-based polyurethane.

3. The method for manufacturing the high heat resistant and high scratch resistant water-based polyurethane according to claim 1, wherein 3-9 wt % of waterborne bridging agent and 0.1-2 wt % cellulose nanofiber (CNF) is added to the acrylic graft modification water-based polyurethane based on the total amount in weight of the acrylic graft modification water-based polyurethane.

4. The method for manufacturing the high heat resistant and high scratch resistant water-based polyurethane according to claim 1, wherein the acrylic monomer is a combination of the following six monomers based on the total amount in weight of the acrylic monomer:
(a) methyl methacrylate 82 wt %;
(b) 2-hydroxyethyl acrylate 6 wt %;
(c) ethyl acrylate 6 wt %;

(d) acrylic acid 3 wt %;
(e) glycidyl methacrylate 1.5 wt %; and
(f) triallyl isocyanurate 1.5 wt %.

5. The method for manufacturing the high heat resistant and high scratch resistant water-based polyurethane according to claim 3, wherein the cellulose nanofiber (CNF) is selected from cellulose nanofiber having a fiber diameter of 3 nm to 10 nm and a fiber length of 100 nm to 3 μm.

6. A high heat resistant and high scratch resistant water-based polyurethane, manufactured by using the method of claim 1.

* * * * *